Oct. 4, 1966 W. J. LINSTROMBERG 3,276,225
ICE CUBE MAKER HAVING MOTOR OPERATED EJECTOR FINGERS
Filed June 24, 1965 9 Sheets-Sheet 1
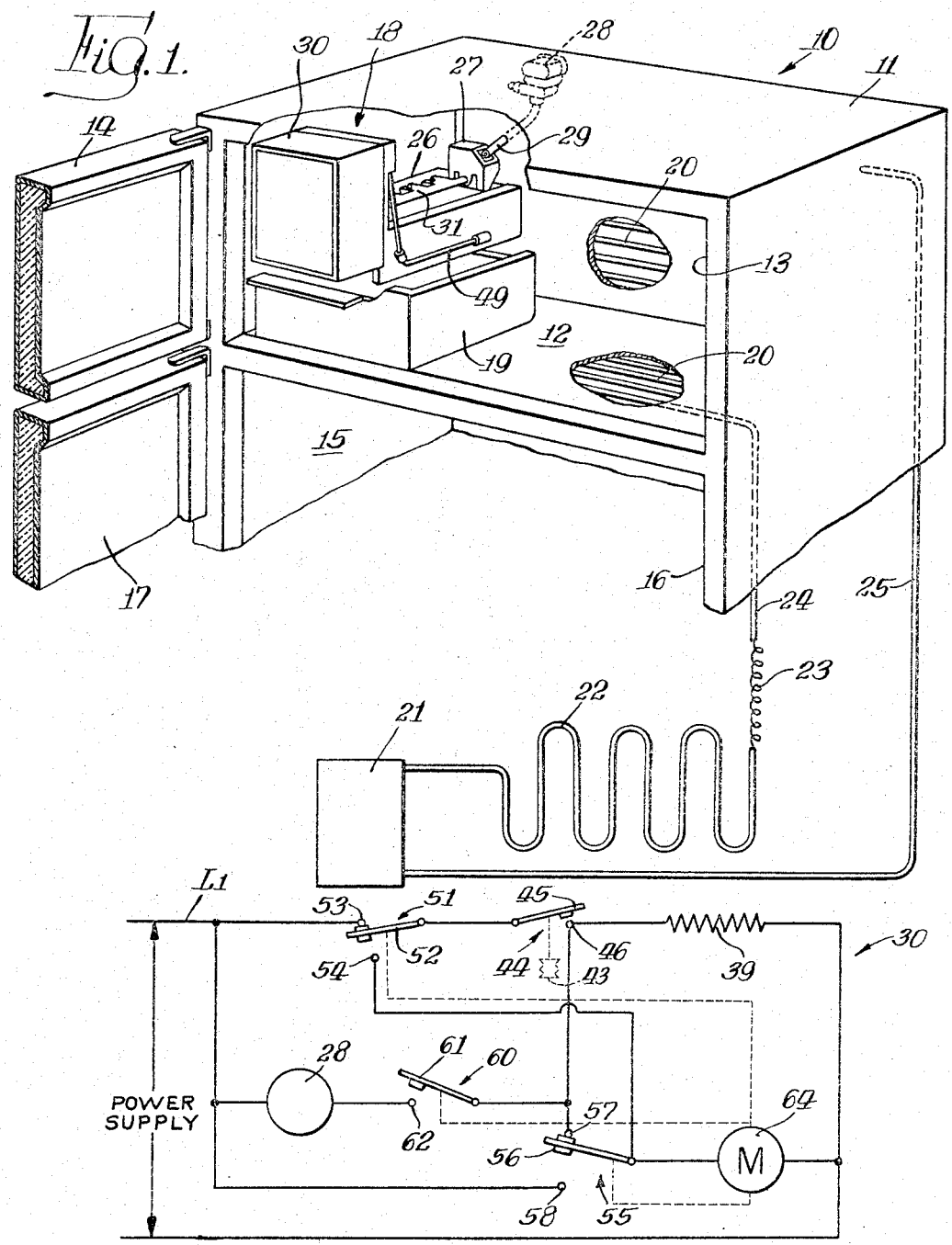
INVENTOR.
William J. Linstromberg

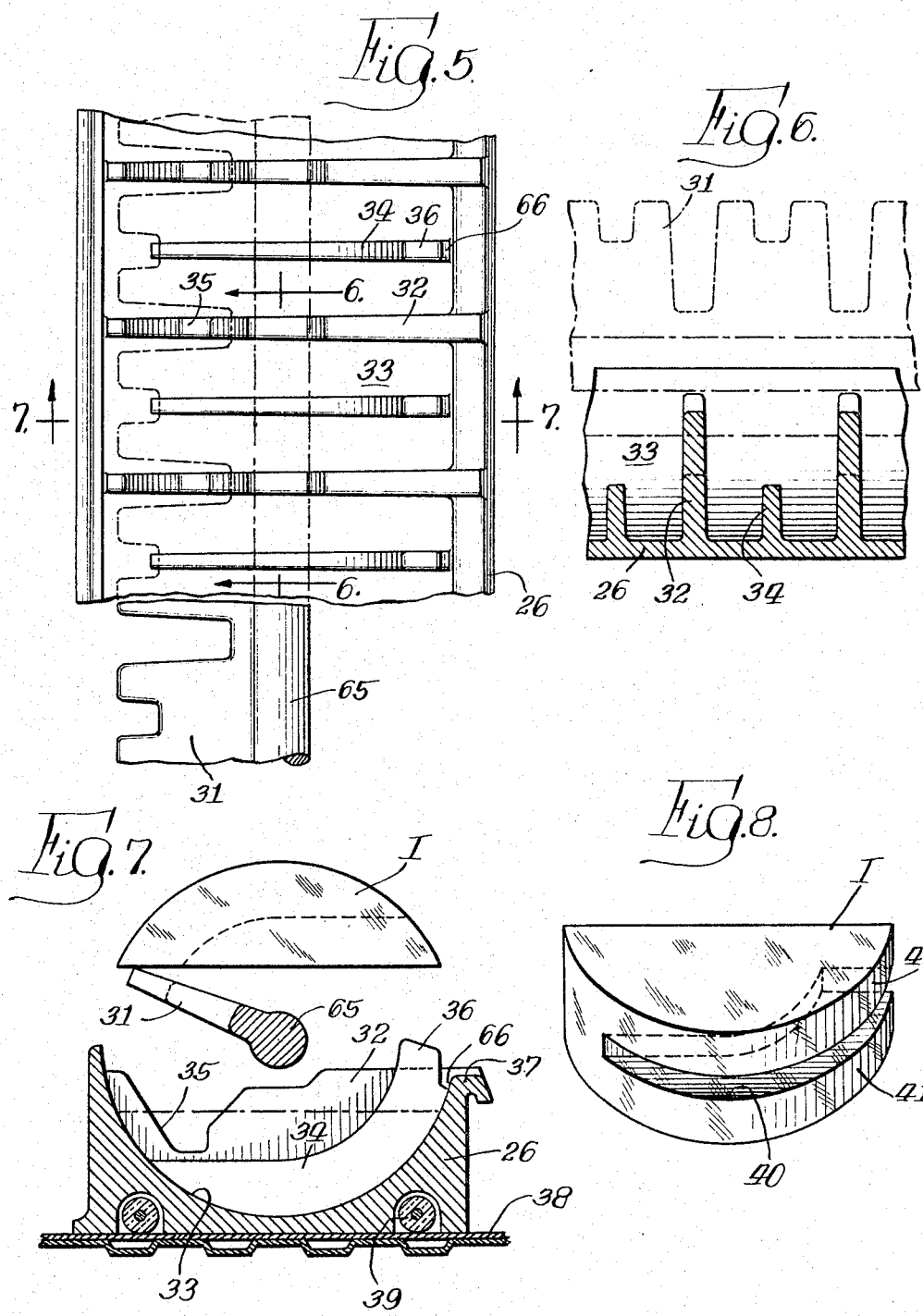

Oct. 4, 1966     W. J. LINSTROMBERG     3,276,225
ICE CUBE MAKER HAVING MOTOR OPERATED EJECTOR FINGERS
Filed June 24, 1965     9 Sheets-Sheet 4
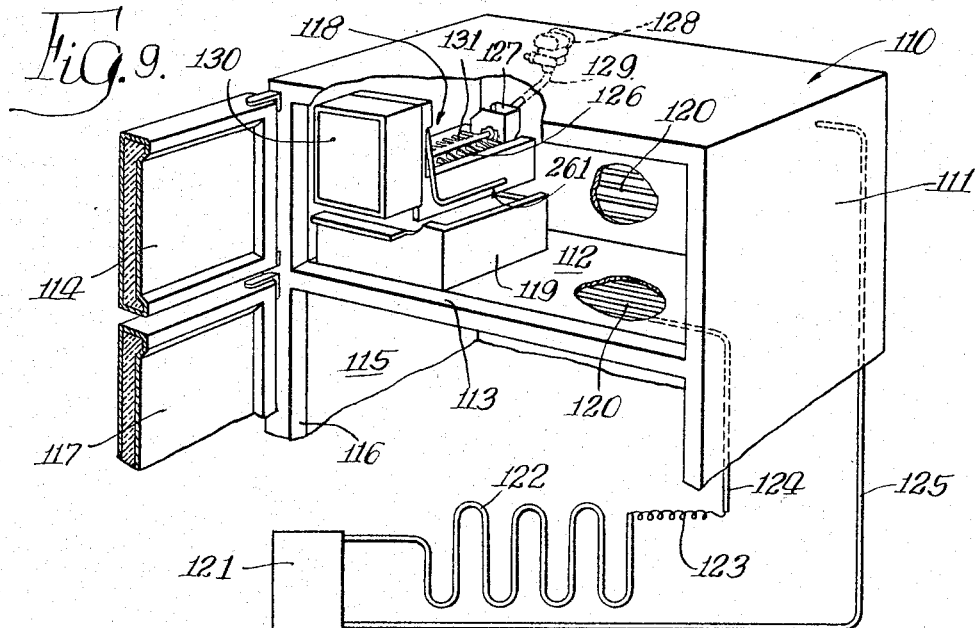
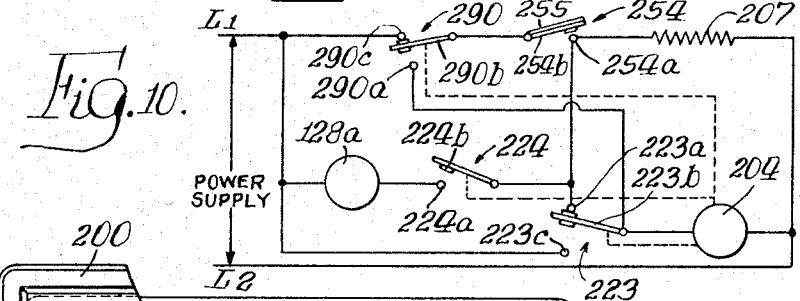
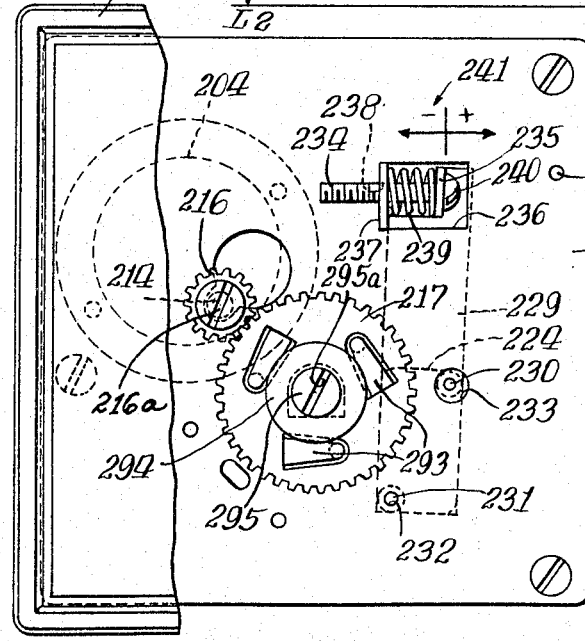
Inventor:—
William J. Linstromberg,
By Hofgren, Wegner, Allen,
Stellman & McCord
Attys

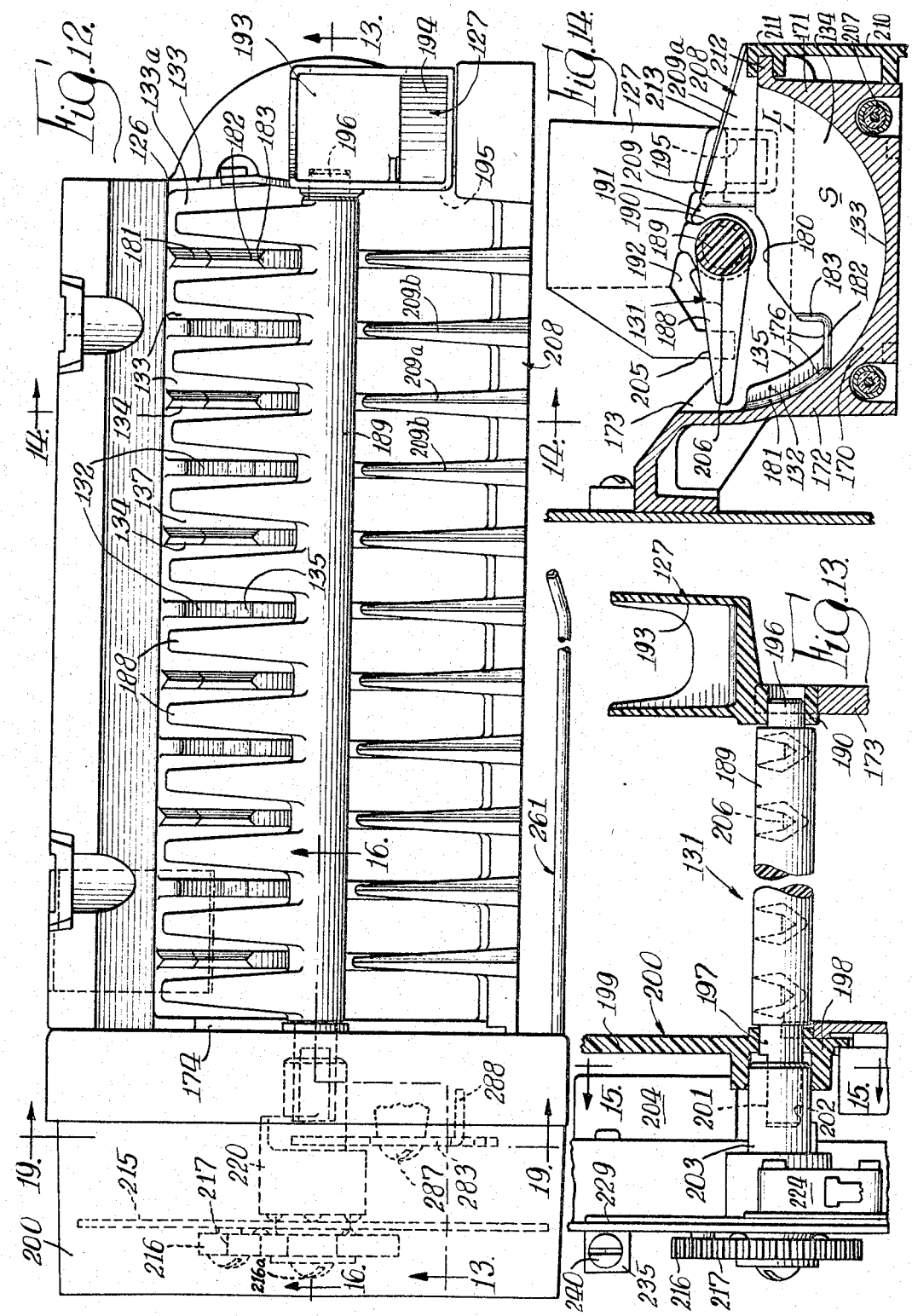

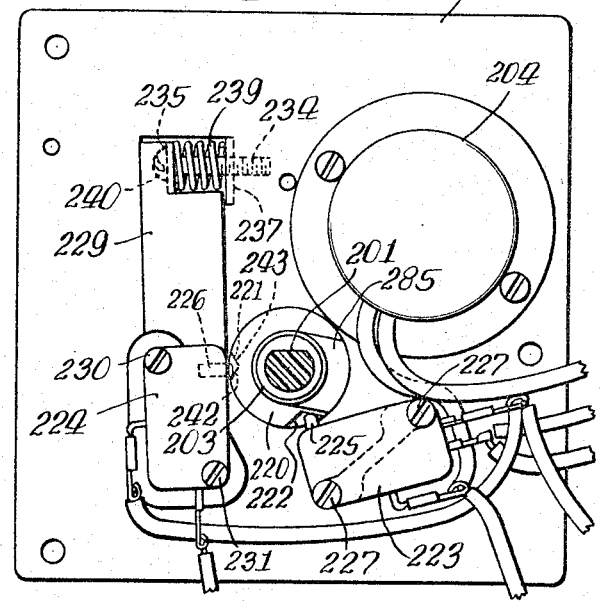
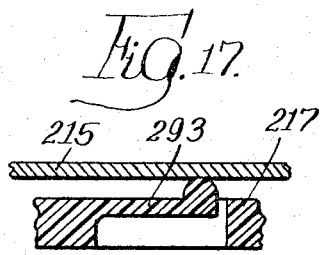
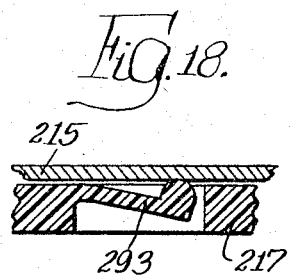
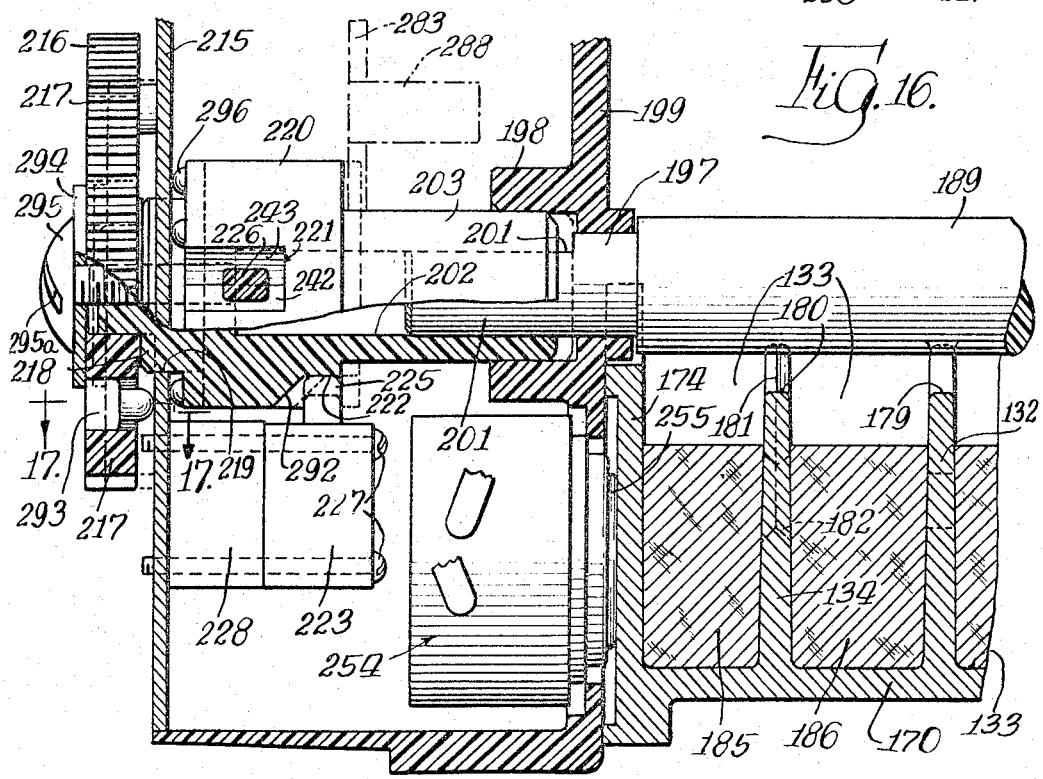

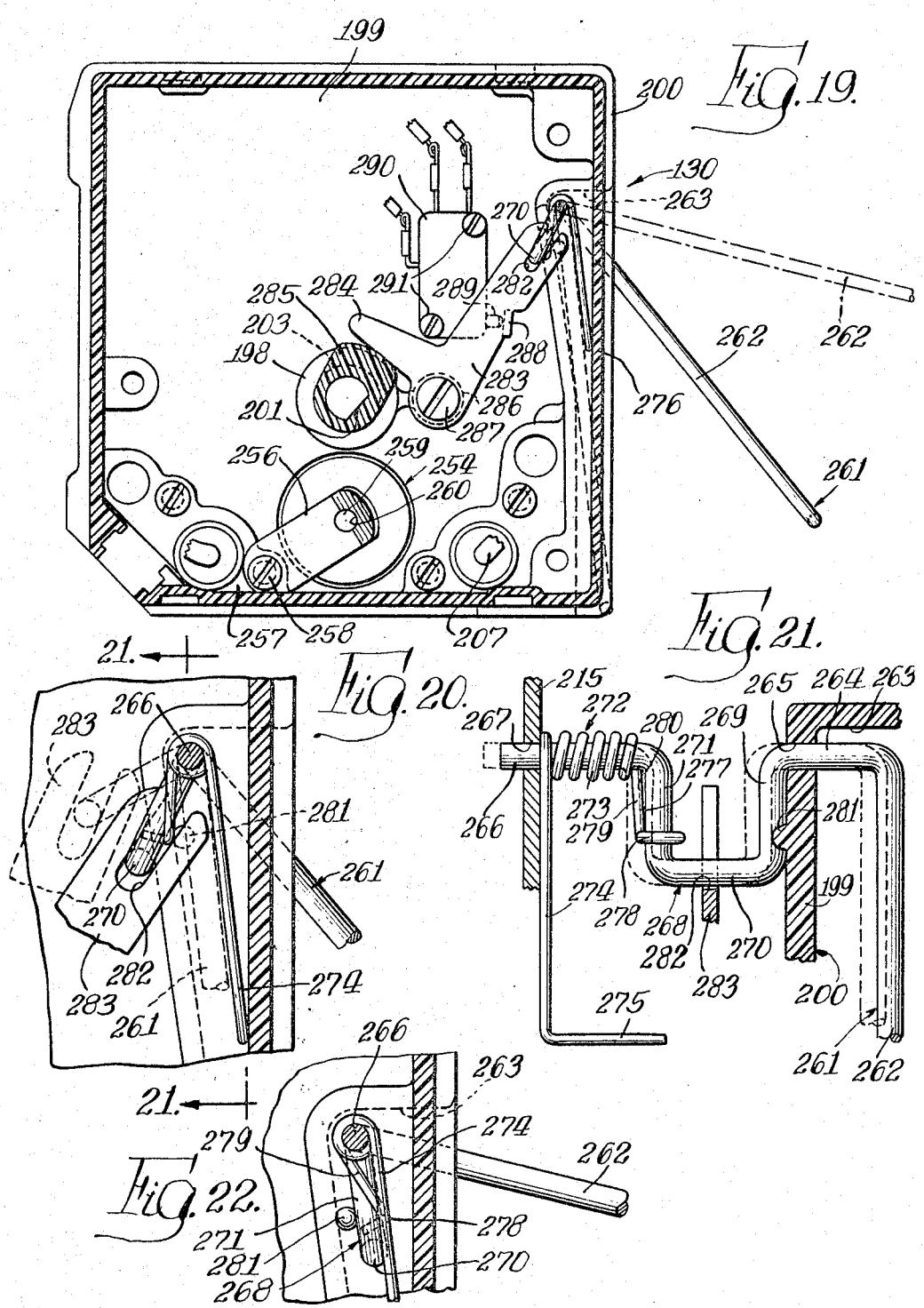

Oct. 4, 1966 W. J. LINSTROMBERG 3,276,225
ICE CUBE MAKER HAVING MOTOR OPERATED EJECTOR FINGERS
Filed June 24, 1965 9 Sheets-Sheet 8
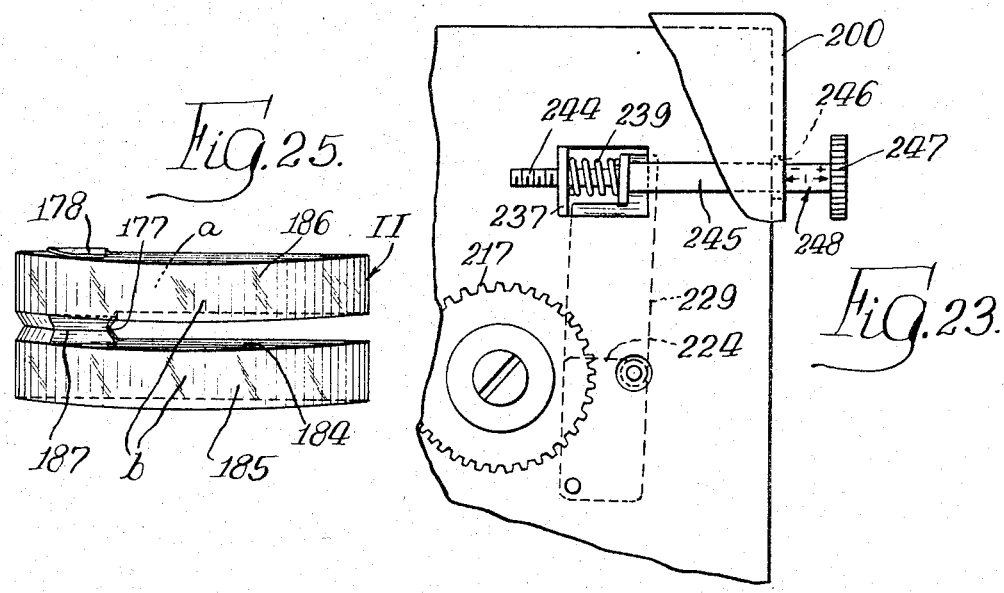
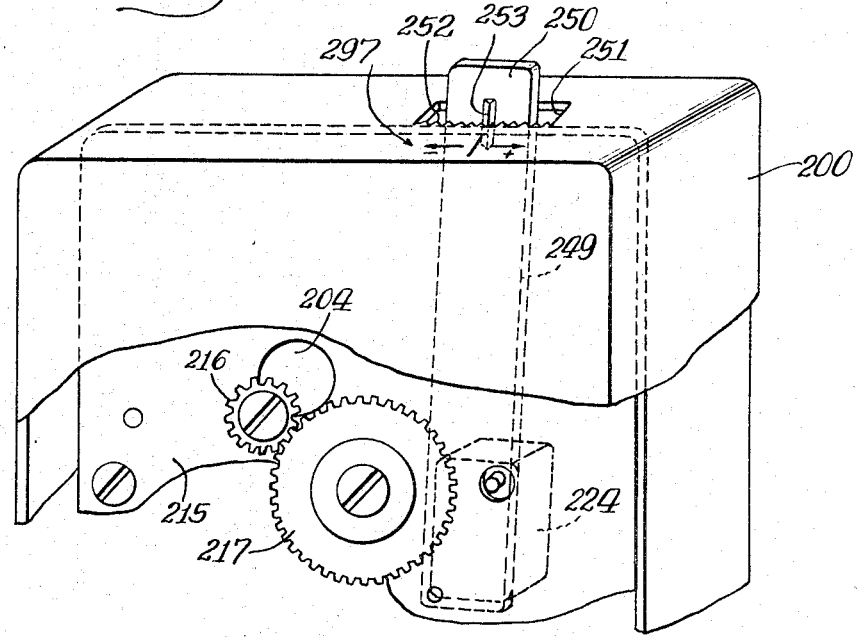

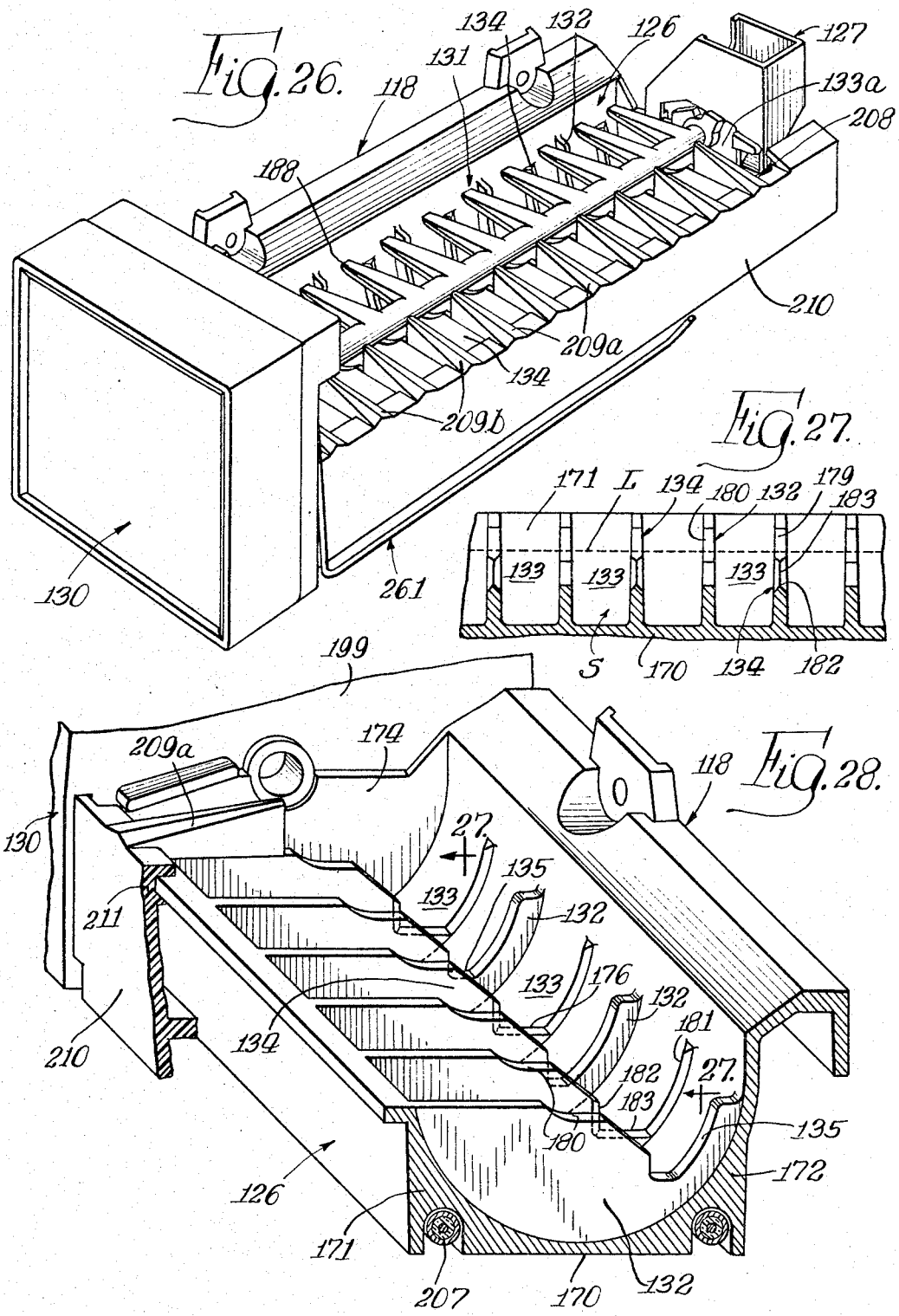

United States Patent Office 3,276,225
Patented Oct. 4, 1966

3,276,225
ICE CUBE MAKER HAVING MOTOR OPERATED
EJECTOR FINGERS
William J. Linstromberg, Evansville, Ind., assignor to
Whirlpool Corporation, a corporation of Delaware
Filed June 24, 1965, Ser. No. 477,060
17 Claims. (Cl. 62—353)

This application comprises a continuation-in-part of my copending application Serial No. 237,010, filed November 13, 1962.

This invention relates to refrigeration apparatus, and in particular to, apparatus for making ice bodies and the like.

In one well known form of ice maker, ice bodies are formed in a suitable mold having a plurality of upwardly opening cavities and are ejected from the mold by suitable means including ejector blades which are caused to move through the cavities in which the ice bodies are formed to force the ice bodies therefrom for delivery to a suitable collecting space. The present invention is concerned with such ice body makers and in particular with the means for controlling the ejection of the ice bodies from the mold.

Thus, a principal feature of the present invention is the provision of new and improved ice maker apparatus.

Another feature of the invention is the provision of such apparatus having new and improved means for ejecting ice bodies from a mold upon completion of the freezing of the ice bodies therein.

A further feature of the invention is the provision of such apparatus having a new and improved means for stripping the ice bodies from the ejector blade.

A further feature of the invention is the provision of such apparatus having new and improved means for assuring the removal of the ejected ice bodies from the mold during the ejection operation.

Still another feature of the invention is the provision of such apparatus having new and improved means for expediting the freezing of the ice bodies in the mold.

Still another feature of the invention is the provision of such apparatus having new and improved means for collecting melt from the ice bodies during the ejection operation and returning the melt to the mold cavities.

Yet another feature of the invention is the provision of such apparatus having new and improved means for providing ice bodies having a novel configuration permitting selective utilization thereof as delivered from the ice body or in readily obtained smaller units.

Still another feature of the invention is the provision of such apparatus having new and improved means for providing ice bodies having substantially extending bifurcated portions permitting facilitated breakage of the ice body into two separate portions when desired.

A yet further feature of the invention is the provision of such an ice maker apparatus having new and improved means for controlling the ejection cycle.

Still another feature of the invention is the provision of such apparatus having new and improved control means wherein a single thermostat is arranged to control both the initiation of the ejection cycle and to prevent overheating of the mold heater means.

A further feature of the invention is the provision of an ice maker apparatus having new and improved means for stripping the ice bodies from the ejector blade during the ejection cycle.

Still another feature of the invention is the provision of such an ice maker apparatus having new and improved fracture-inducing means for facilitating intentional breaking of the ice bodies.

Another feature of the invention is the provision of such an ice maker apparatus having a new and improved ejector structure.

Still another feature of the invention is the provision of such an ice maker apparatus having a new and improved mold structure.

Other features and advantages of the invention will be apparent from the following description taken in connection with the accompanying drawings wherein:

FIGURE 1 is a fragmentary perspective view of a refrigeration apparatus having an ice maker embodying the invention, portions being broken away for facilitating illustration of the apparatus;

FIGURE 2 is a schematic electrical wiring diagram illustrating the circuitry of the ice maker apparatus;

FIGURE 5 is a fragmentary plan view of the mold and ejector blade;

FIGURE 6 is a fragmentary vertical section taken substantially along the line 6—6 of FIGURE 5;

FIGURE 7 is a fragmentary vertical transverse section taken substantially along the line 7—7 of FIGURE 5 illustrating the ejection of the ice body from the mold;

FIGURE 8 is a perspective view of an ice body as formed in the ice maker apparatus;

FIGURE 9 is a fragmentary perspective view of a refrigeration apparatus having a modified form of ice maker embodying the invention, portions being broken away for facilitating illustration of the apparatus;

FIGURE 10 is a schematic electrical wiring diagram illustrating the circuitry of a modified ice maker of FIGURE 9;

FIGURE 11 is a front view of the control of the ice maker with the cover broken away to illustrate in elevation the elements disposed forwardly of a front mounting plate of the control;

FIGURE 12 is a plan view of the ice maker;

FIGURE 13 is a vertical section taken substantially along the line 13—13 of FIGURE 12;

FIGURE 14 is a transverse vertical section taken substantially along the line 14—14 of FIGURE 12;

FIGURE 15 is a vertical section of the control taken substantially along the line 15—15 of FIGURE 13;

FIGURE 16 is an enlarged vertical section taken substantially along the line 16—16 of FIGURE 12;

FIGURE 17 is a fragmentary horizontal section taken substantially along the line 17—17 of FIGURE 16;

FIGURE 18 is a fragmentary horizontal section similar to that of FIGURE 17 but with the gear in an axially rearwardly displaced position;

FIGURE 19 is a transverse vertical section taken substantially along the line 19—19 of FIGURE 12;

FIGURE 20 is a fragmentary enlarged vertical section illustrating a portion of the control as shown in FIGURE 19;

FIGURE 21 is a fragmentary vertical section taken substantially along the line 21—21 of FIGURE 20;

FIGURE 22 is a fragmentary transverse section similar to that of FIGURE 20 but with the sensing arm in a shutoff position;

FIGURE 23 is a fragmentary front elevation of a modified form of control embodying the invention having means for adjusting the water delivery disposed externally of the housing, with the cover broken away for facilitated illustration;

FIGURE 24 is a front elevation of still another modified form of control, having means for adjusting the water delivery from externally of the housing;

FIGURE 25 is a perspective view of an ice body as formed in the ice maker illustrated in FIGURES 9 through 24;

FIGURE 26 is a perspective view of the modified ice maker;

FIGURE 27 is a fragmentary vertical section taken substantially along the line 27—27 of FIGURE 28; and FIGURE 28 is a fragmentary perspective view of the mold of the modified ice maker, with a portion of the stripper member as mounted thereon.

Figure 3:
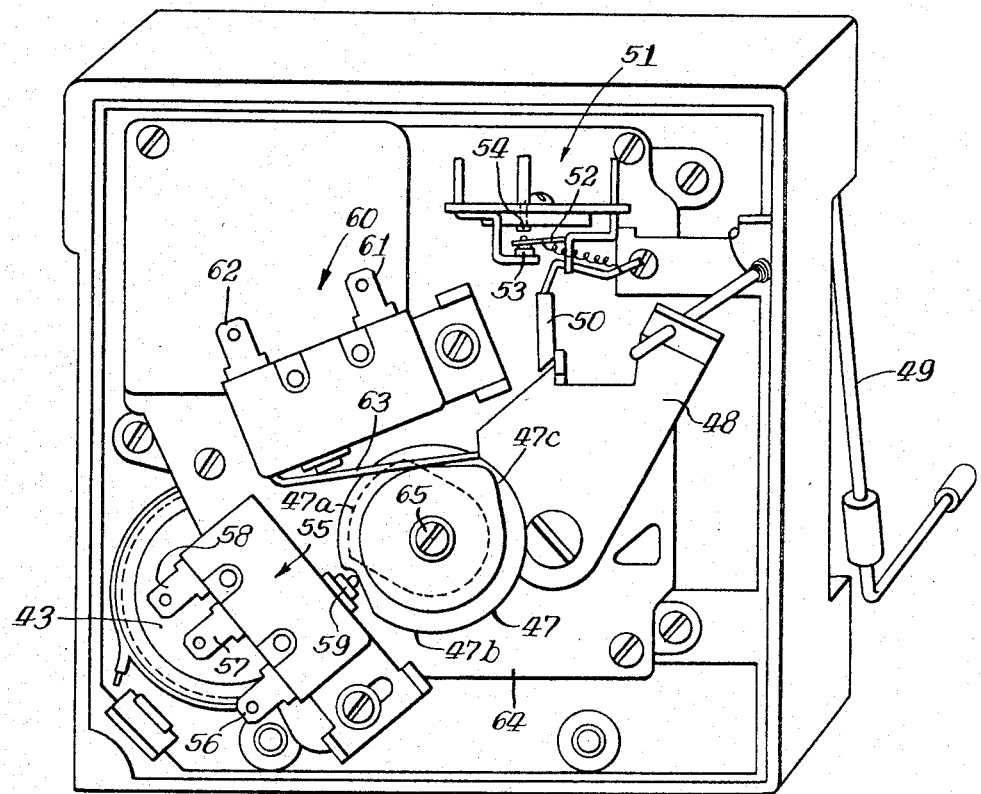
FIGURE 3 is an enlarged partial perspective view of the control of the ice maker.

In the exemplary embodiment of the invention as disclosed in the drawing, a refrigeration apparatus generally designated 10 is shown to include an insulated cabinet 11 defining a chamber 12 having a front opening 13 selectively closed by a door 14. In the illustrated embodiment, the cabinet 11 further defines a second chamber 15 having a front opening 16 selectively closed by a second door 17. An ice body maker generally designated 18 is disposed within the chamber 12 for forming ice bodies and delivering them to a subjacent collecting bin 19 also disposed within the chamber 12. Chambers 12 and 15 are refrigerated by a suitable evaporator 20 disposed within the walls of the cabinet 11. The evaporator herein forms a portion of a conventional refrigeration circuit including a compressor 21, a condenser 22, a capillary 23, and conduits 24 and 25 for delivering the refrigerant to and from the evaporator 20.

The ice maker apparatus 18 includes a mold 26 in which the ice bodies I are formed, water being delivered to the mold by an inlet 27 connected to a solenoid operated valve 28 by a delivery tube 29. The solenoid valve 28 may be connected to a suitable source of water under pressure (not shown). The ice maker apparatus 18 further includes a control 30 disposed at the front end of the mold 26 and arranged to operate an ejector blade 31 which upon completion of the freezing of the ice bodies in the mold 26 removes the ice bodies I from the mold to the subjacent collecting bin 19.

Mold

As discussed briefly above, the present invention comprehends an improved ice maker apparatus providing facilitated removal of the ice bodies from the mold and providing ice bodies having a novel improved configuration. Reference now being had more specifically to FIGURES 4 through 8, the mold 26 is shown to comprise a tray structure having a plurality of partition walls 32 extending transversely across the mold to define a plurality of cavities 33 in which a corresponding plurality of ice bodies are formed. Each cavity 33 is partially divided by a partial transverse wall 34. The partition walls 32 are provided with recessed portions 35 defining weirs between the respective cavities 33 to permit water to flow from cavity to cavity during the filling operation. The partial dividing walls 34, as best seen in FIGURE 7, include an upper portion 36 extending to above the top 37 of the mold 26 and arranged to effect positive stripping of the ice bodies I from the ejector blade 31, as will be described more fully in the description of the operation of the apparatus.

In the illustrated embodiment, the mold is refrigerated by means of a refrigeration shelf 38 which carries the mold; however, any suitable means for effecting the freezing of the ice bodies may be employed within the scope of the invention. The removal of the ice bodies I from the mold cavities 33 is facilitated by means of a heater wire 39 extending through the mold 26, as shown in FIGURE 7. Heater 39 warms the mold sufficiently to melt the surface of the ice bodies engaging the walls of the mold cavities and thereby frees the ice bodies for ejection from the cavities by the ejector blade 31.

As shown in FIGURE 8, the ice body I formed by the novel mold 26 comprises a generally semi-cylindrical body having a slot 40 extending arcuately therein to define a pair of spaced portions 41–42. The slot extends substantially into the semi-cylindrical configuration of the ice body so as to permit facilitated breaking of the ice body into two complete discrete portions by manipulation of the two portions 41 and 42 toward each other as by squeezing between the user's fingers. Thus, the ice bodies may be utilized as delivered from the ice maker 18 or as a pair of ice bodies each comprising one-half of the ice body I shown in FIGURE 8.

The dividing wall 34 is preferably formed of a thermal conductive material, such as metal, so as to provide improved expedited freezing of the ice bodies in the cavities 33 by virtue of the increased heat transfer surface provided.

Control

Figure 4:
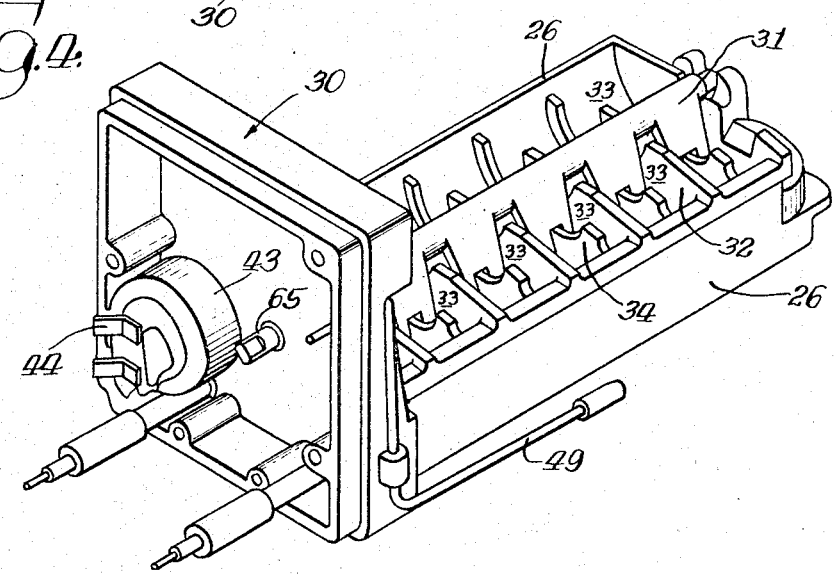
FIGURE 4 is a perspective view of a portion of the control, illustrating the arrangement of the thermostat therein, and with the mold and ejector blade structure extending rearwardly therefrom.

Referring now more specifically to FIGURES 3, 4 and 5, control 30 includes a thermostat 43 in thermal transfer association with mold 26. The thermostat includes a switch 44 which, as best seen in FIGURE 2, comprises a single throw switch having a moving contact 45 and a fixed contact 46. Control 30 further includes a motor 64 which rotates a shaft 65 (see FIGURE 4) carrying the ejector blade 31 and a tripartite cam 47. A rear cam surface 47a of cam 47 cooperates with a pivotally mounted shut-off plate 48 for controlling a sensing arm 49 extending downwardly from control 30 to the collecting bin 19 for selective movement into and from bin 19 to sense the level of ice bodies collected therein. Plate 48 further engages an actuator 50 of a shut-off switch generally designated 51 having a movable contact 52 and a pair of fixed contacts 53 and 54. Switch 51 is biased to engage its moving contact 52 with fixed contact 53 when the control 30 is arranged, as shown in FIGURE 3.

Control 30 further includes a holding switch 55 having a moving contact 56 selectively engageable with a first fixed contact 57 and a second fixed contact 58. Switch 55 includes an actuator 59 which rides on cam surface 47b of cam 47, as shown in FIGURE 3.

A third switch 60 of control 30 comprises a water valve switch having a movable contact 61 and a fixed contact 62. Switch 60 includes an actuator 63 which engages a third cam surface 47c of cam 47, as shown in FIGURE 3.

Operation

The operation of control 30 is as follows. Assuming that the mold contains a quantity of water in the process of being frozen to form the ice bodies I in the cavities 33 and the level of the ice bodies in collecting bin 19 is below the preselected full level, the mold thermostat 43 senses a relatively warm condition whereby the switch 44 is in the open arrangement, as shown in FIGURE 2. Further, the shut-off switch 51 has moving contact 52 thereof closed with fixed contact 53, holding switch 55 has moving contact 56 thereof closed with fixed contact 57 and water valve switch 60 has its moving contact 61 spaced from fixed contact 62. Thus, the control 30 is in a de-energized condition between the power supply leads $L_1$ and $L_2$.

In the illustrated embodiment, the thermostat 43 is arranged to have a cut-in temperature of 9° F., and a reset or cut-off temperature of 45° F. Thus, when the water in the mold cavities 33 becomes completely frozen and the temperature thereof drops to 9° F., the thermostat switch 44 is operated to close contact 45 with contact 46, thereby establishing a circuit from power supply lead $L_1$ through contacts 53–52 of switch 51, contacts 45–46 of switch 44, and through heater 39 to lead $L_2$. At the same time, control motor 64 is energized from contact 46 through contacts 57–56 of holding switch 55. This causes the cam 47 to rotate, whereupon, after a few degrees of rotation, cam surface 47b actuates switch 55 to switch moving contact 56 from fixed contact 57 to fixed contact 58 thereby establishing a holding circuit from lead L₁, through contacts 58–56 to motor 64, whereby the motor is energized regardless of the condition of thermostat switch 44.

Upon a small additional amount of rotation of cam 47, cam surface 47a causes shut-off plate 48 to pivot in a clockwise direction, thereby swinging the sensing arm 49 upwardly from the collecting bin 19. At the same time, shut-off plate 48 permits actuator 50 to throw moving contact 52 of switch 51 from fixed contact 53 into engagement with fixed contact 54. This establishes a circuit to heater 39 from lead L₁ through contacts 58–56 of holding switch 55, contacts 54–52 of shut-off switch 51, and contacts 45–46 of thermostat switch 44. Thus, the control motor 64 is energized independently of thermostat switch 44, while heater 39 is energized under the control of thermostat switch 44 at this time.

The operation of motor 64 causes rotation of shaft 65 until the ejector blade 31 engages the ice bodies I within the mold cavities 33. In the event that the ice bodies have not been freed from the mold walls, the motor 64 stalls until such time as mold heater 39 melts the bodies free. The motor then continues rotation of ejector blade 31, moving the ice bodies from the cavities 33. At the same time, shut-off plate 48 is pivoted by cam 47a to lower the sensing arm 49 into the collecting bin 19. If the level of the ice bodies collected in bin 19 is below the preselected level, the arm moves downwardly into bin 19 and allows the plate 48 to pivot sufficiently to permit switch 51 to become repositioned, as shown in FIGURE 3, with contact 52 spaced from fixed contact 54 and now engaging fixed contact 53.

After 270 degrees of rotation of cam 47, the cam surface 47c operates actuator 63 of switch 60 to close moving contact 61 with fixed contact 62. However, as thermostat switch 44 remains closed at this time, the short circuit from lead L₁ through contacts 53–52 of switch 51 and contacts 45–46 of switch 44, in parallel with the circuit from lead L₁ through water valve solenoid 28 and now-closed switch 60, prevents energization of solenoid 28 at this time.

The motor 64 continues to operate to rotate ejector blade 31 until the ice bodies become inverted and rest on the ejector blade and upper portion 36 of the partial walls 34. Concurrently, cam 47 becomes positioned so as to cause surface 47b to permit holding switch moving contact 56 to move from fixed contact 58 to fixed contact 57. Although the holding circuit through contacts 58–56 is now broken, the energization of motor 64 is continued at this time from lead L₁ through contacts 53–52 of switch 51, contacts 45–46 of switch 44, and contacts 57–56 of switch 55.

The motor 64 continues to rotate to swing ejector blade 31 downwardly through cavities 33 a second time, the ice bodies I having been positively removed from the ejector blade by the engagement thereof with the stripping portion 36 of the partial walls 34, positively precluding the ice bodies from re-entering the mold cavities and jamming the ice maker. As a result of the heating of the mold by heater 39, some melting of the ice bodies may occur prior to the complete removal of the ice bodies from adjacent the mold to the bin 19. A trough 66 is provided in the partial walls 34 to permit this melt to pass back into the cavities 33 and prevent the melt from passing down the exterior of the mold into the collecting bin 19. The continued rotation of motor 64 now again closes moving contact 56 of holding switch 55 with fixed contact 58 thereof to re-establish the holding circuit to control motor 64.

Shut-off switch 51 is again actuated by cam 47a as discussed above to close moving contact 52 with fixed contact 54 and open the circuit between contact 52 and contact 53. Sufficient heat will have been delivered to the mold 26 shortly after the second closing of the holding switch contact 56 with the fixed contact 58 to cause thermostat 43 to move contact 45 of switch 44 away from fixed contact 46. As indicated above, the thermostat may be arranged to effect this transfer at a sensed temperature of approximately 45° F. This opening of switch 44 de-energizes the mold heater 39, as it breaks the circuit from switch 51. However, as holding switch 55 is arranged with contact 56 closed with contact 58 thereof the control motor 64 continues to operate to reclose the contact 61 of water valve switch 60 with contact 62 thereof. As switch 44 is now open, the solenoid 28 will not be short circuited at this time (as it was during the first closing of switch 60) but rather will now become energized to admit water through inlet 27 to the mold cavities 33 for forming a subsequent group of ice bodies I in mold 26. After a preselected time, cam surface 47c permits switch 60 to reopen, thereby terminating the flow of water to the mold cavities. The completion of the control cycle occurs upon a small additional operation of motor 64 whereby cam surface 47b permits holding switch 55 to move contact 56 from contact 58 to contact 57. The control 30 is now fully de-energized as at the beginning of the operation cycle discussed above, whereby a subsequent cycle will become initiated by the completed freezing of the ice bodies in the mold as discussed above.

When a sufficient number of ice bodies have been delivered to collecting bin 19 so as to cause the level therein to rise to the preselected full level, the operation of the control 30 as discussed above will be interrupted by preventing the shut-off plate 48 from returning to the position of FIGURE 3. Thus, moving contact 52 remains in engagement with fixed contact 54 and the circuit remains broken between contacts 53 and 52. This condition will remain until such time as the level of ice bodies in bin 19 is lowered as by removing some or all of the ice bodies therein. When this occurs the release of sensing arm 49 permits the return of shut-off plate 48 to the position of FIGURE 3, thereby allowing the switch 51 to close moving contact 52 with fixed contact 53 and permitting subsequent operation of the control 30, as discussed above. It should be noted that this termination of operation of control 30 may occur during either one of the two rotations of the cam 47 in the complete cycle of operation of control 30.

Thusly, control 30 utilizes a single thermostat 43 to control both the mold heater 39 and the control motor 64. The control is arranged to prevent overheating by the mold heater 39 such as might occur if the control motor 64 or the holding switch fails or the ejector blade 31 becomes jammed, such as by interference with the mold walls. By virtue of the continued control of the heater 39 by the thermostat switch 44, the temperature of the mold will be maintained between the upper and lower limits of the thermostat, herein 45° F. and 9° F., respectively.

Modified ice maker

Referring now to FIGURES 9 through 28, a modified form of ice maker embodying the invention is shown to comprise an ice maker 118 provided in a refrigeration apparatus generally designated 110 similar to the above described ice maker 18 and refrigeration apparatus 10. As shown in FIGURE 9, ice maker 118 is disposed within a chamber 112 defined by an insulated cabinet 111 having a front opening 113 selectively closed by a door 114. The refrigeration apparatus 110 may further include a subjacent above-freezing chamber 115 having a front opening 116 selectively closed by a door 117. Chambers 112 and 115 are suitably refrigerated as by forced air or refrigerated plate conductive heat transfer means, herein they are refrigerated by a suitable evaporator 120 disposed within the walls of the cabinet 111. The evaporator herein forms a portion of a conventional refrigeration circuit including a compressor 121, a condenser 122, a capillary 123, and conduits 124 and 125 for delivering refrigerant to and from the evaporator 120.

The ice maker 118, as shown in FIGURE 26, includes a mold 126 in which ice bodies II (FIGURE 25) are formed and from which the ice bodies are ejected to a subjacent collecting bin 119 (FIGURE 9) by means of an ejector 131 which sweeps through the mold during the ejection cycle. The ejector member swings the ice bodies out of the mold and against a stripper member 208 (FIGURE 26) which effectively positively strips the ice bodies from the ejector 131 and causes them to fall downwardly into the collecting bin 119. Cyclical operation of the ejector 131 is automatically effected by a control 130 disposed at the forward end of the mold 126 (FIGURE 26). In addition to cycling the ejector 131, control 130 further automatically provides for refilling of the mold for subsequent further ice body formation therein, in the event that the level of ice bodies in the collecting bin 119 is below a preselected "full" level. Toward this end, control 130 is provided with a sensing arm 261 which periodically senses the level of ice bodies (i.e. during each ejection cycle) and suitably affects the operation of the control 130 to discontinue the ice forming cycling discussed above when the level of ice bodies in collecting bin 119 reaches the preselected level.

Mold 126 defines a plurality of upwardly opening cavities 133 in which the ice bodies II are formed. The water from which the ice bodies are formed is delivered to the mold 126 by means of an inlet 127 connected to a solenoid operated valve 128 by a delivery tube 129. Valve 128 may be connected to a suitable source of water under pressure (not shown).

*Modified mold*

Referring to FIGURES 12, 14 and 28, mold 126 herein more specifically comprises a tray structure having a bottom wall 170, side walls 171 and 172, rear end wall 173, and a front end wall 174. A plurality of partition walls 132 extend transversely across the mold to define, with the above indicated tray walls, the cavities 133 in which the respective ice bodies II are formed. Herein, each cavity 133 is partially divided by a partial dividing wall 134 which extends transversely across the cavity, as best seen in FIGURES 14 and 28. Each of the partition walls and dividing walls is provided with a recessed upper edge portion through which the water flows from the end cavity 133a successively forwardly to the respective cavities until all cavities are filled to the level L, as shown in FIGURE 14. Thus, the recessed edge portions of the respective partition and dividing walls, over which the water flows, effectively define a plurality of weirs over which a small body, or bridge, of connecting ice forms during the freezing operation. As shown in FIGURE 14, however, the recess 176 in the upper edge of the partial dividing wall 134 is substantially larger than the recess 135 in the partition wall 132 below the level L so that the connecting portion 177 of ice disposed in the recess 176 will be substantially larger, and less frangible, than the connecting portion 178 of ice in the recess 135. The connecting ice portion 177 of ice body II, as shown in FIGURE 25, is preferably sufficiently strong to prevent breaking thereof during the normal ejection and transfer of the ice body II from the mold cavity 133 to the collecting bin 119. Illustratively, the connecting portions 178 between the respective ice bodies may break as a result of the impact of the ice bodies resulting from their free fall into the collecting bin, the connecting portions 177 being sufficiently strong to preclude breakage as from such impact forces.

As shown in FIGURE 16, the partition walls 132 and partial dividing walls 134 may narrow slightly, upwardly from bottom wall 170. Each partition wall is provided with a substantially flat upper surface 179. The partial dividing wall includes a substantially flat upper surface portion 180 (FIGURE 14), but the portion thereof defining the recess 176 is provided with a chamfered, or wedge-shaped, edge which as best seen in FIGURE 14 includes an outer portion 181, a bottom portion 182, and an inner portion 183. Thus, the partial dividing wall 134 forms a slot 184 in the ice body II (FIGURE 25) effectively dividing the ice body into a pair of spaced major portions 185 and 186 disposed to the opposite sides of the partial dividing wall 134 during the forming of the ice body in cavity 133, and connected by the connecting ice portion 177 to define the complete, bifurcated ice body. The chamfered edge portions 182 and 183 of the recess 176 form a fracture-inducing line 187 in the ice body at the inner edge of the slot 184. Likewise, chamfered edge portion 181 forms an extension of the fracture-inducing line 187 along a portion of the periphery of the ice body II. Thus, while connecting ice portion 177 is relatively strong and prevents separation of the ice body portions 185 and 186 from each other during the ejection and collecting in bin 119, the ice body II may be subsequently readily broken into two portions by simple fracture of the ice body along the line 187.

As shown in FIGURE 14, dividing walls 134 extend inwardly from the lower right-hand boundary of the space S in cavity 133 below the level L toward the upper left-hand boundary of the space defined by the open end of the cavity at level L and the upper portion of the left mold side wall 172 below the level L. The resultant ice body II, therefore, has a transverse periphery (i.e. perpendicular to the longitudinal extent of the mold) which is defined by a flat upper surface *a* and a segmentally cylindrical lower surface *b* corresponding to the periphery of the space S as defined by the water level L and the cylindrical surface of the cavity 133 below the level L as shown in FIGURE 14. Each partial dividing wall 134 extends lengthwise parallel to the dividing walls along this periphery of the ice body-forming space over approximately one-half the full periphery of the space while yet providing the desirable connecting portion 177 in the ice body II by virtue of the larger size of dividing wall recess 176 as compared to recess 135 of the partition wall 132. The minimum cross-section of the connecting ice portion 177 as defined substantially by the area outwardly of the fracture-inducing line 187 parallel to the lengthwise extent of the dividing wall 134 is preselected to provide the desirable normal maintaining of the two ice body portions 185 and 186 in attached association until separated by intentional action of the user.

As shown in FIGURE 12, the partial dividing wall 134 herein is disposed substantially at the center of cavity 133 so as to divide the cavity symmetrically into two halves whereby each of the ice body portions 185 and 186 is substantially identical. As further shown in FIGURE 16, each of the partition and partial dividing walls is formed integrally with the bottom wall 170 and the side walls of the mold. The mold is preferably formed of a material having high thermal conductivity and, thus, the partial dividing walls 134 provide an improved fast freezing of the ice body as it projects upwardly into the center of the forming ice bodies to conduct heat readily from this mid-portion of the water delivered to the cavity 133, which normally is the last portion to be frozen. Thus, ice maker 118 provides a substantially increased rate of ice body production providing improved efficiency in the operation of apparatus 110.

*Modified thermostat*

The refrigeration of the water in the mold 126 is herein effected by the cold air within chamber 112; although as will be obvious to those skilled in the art, other suitable means may be employed for refrigerating the mold within the scope of the invention. Control 130, as indicated above, includes a thermostat 254, herein of the bimetallic type, which senses the temperature of the mold 126 to determine the completion of freezing of the ice bodies and as a result thereof automatically initiate the ejection cycle. As best seen in FIGURE 16, the thermostat includes a sensing portion 255 projecting rearwardly through the housing wall 199 into thermal transfer contact with the front wall 174 of the mold. As shown in FIGURE 19, the thermostat may be biased against the mold wall 174 by a flat spring 256 secured to a boss 257 in housing 200 by suitable means such as screw 258. The thermostat may be provided with an axial outwardly projecting boss 259 extending through a suitable opening 260 in the distal end of the spring 256.

Herein, the completion of the ice body formation is indicated when the temperature of the mold is reduced to approximately 23° F. Heretofore, without the provision of a thermally conductive partial dividing wall such as dividing wall 134 herein, the temperature of the mold upon complete freezing of the ice bodies therein has had to be approximately 13° F. or below. By removing heat energy directly from a mid-portion of the cavity 133, the ice bodies are formed with substantially less refrigeration than heretofore required where the refrigerating surfaces of the mold cavities were limited to the peripheral boundaries thereof. As a result of the improved efficiency of refrigeration, thermostat means 254 herein may comprise an inexpensive relatively wide tolerance thermostat thereby substantially reducing the cost of control 130 as compared to the known controls requiring the use of more expensive thermostats having narrower operating tolerances. More specifically, herein thermostat 254 comprises a thermostat having an operational tolerance of plus or minus 5° F. Thus, the thermostat may comprise a thermostat nominally rated to operate at a low temperature of 18° F. As the actual operating temperature of the thermostat may be 23° F. (i.e. 18°+5°=23° where the specific thermostat is one at the upper end of the tolerance range), the ejection cycle as controlled by the thermostat will be initiated at the time the temperature of the mold as sensed by the thermostat is reduced to 23° F. Where the specific thermostat is one which actually operates at the lower end of the tolerance range, i.e. at 13° F., the refrigeration of the mold will be continued beyond the point where the ice bodies are fully formed and until the portion of the mold sensed by the thermostat reaches the 13° F. point. This entire range of operation, however, is above the range of operation of the thermostats previously employed which were required to sense a mold temperature at 13° F. or below. As the temperature of the refrigerating means is conventionally approximately 0° F., if a 5° F. tolerance thermostat were to be used where this lower temperature range is required, one would have to select thermostats nominally rated at 8° F. so that at the upper end of the tolerance range 13° F. operation would be obtained and at the lower end of the range the thermostats would operate at only 3° F. The lowering of the mold to approximately 3° F. by refrigerating means which is at approximately 0° F. is substantially impractical because of the small temperature differential and, thus, the use of relatively expensive narrow tolerance thermostats such as thermostats having tolerances of plus or minus 3° F. only have heretofore been the commercial practice. Thus, it has been conventional to employ thermostats nominally rated at 10° F. with a plus or minus 3° F. tolerance so that such thermostats operate in the range of 7° F. to 13 F. to thereby provide the necessary differential above the 0° F. refrigeration temperature to permit satisfactory operation. Such narrow tolerance thermostats, however, are substantanially more expensive than the above-described wide tolerance 5° F. temperature differential thermostat employed in the present invention and, thus, control 130 provides a substantial reduction in the cost thereof as compared to the conventional controls requiring such narrow tolerance thermostats.

Thus, ice maker 118 is arranged so that the completion of the freezing of the ice bodies II is caused to occur while the temperature of the mold portion sensed by the thermostat means 254 is relatively high, i.e. closer to the water freezing temperature of 32° F. than to the refrigeration temperature herein of 0° F. Herein, this indicative mold temperature is 23° F. The substantial differential between such a relatively high thermostat operating temperature and the relatively low 0° F. refrigeration temperature permits the highly desirable use of the above described low cost thermostat means 254. To further reduce the cost of the thermostat 254, it is desirable to utilize a relatively high reset temperature. In the illustrated embodiment, the reset temperature of the thermostat 254 is approximately 50° F. and, thus, thermostat 254 may be a relatively low cost thermostat having a differential of over 30° F. between the actuation 23° F. temperature and the reset 50° F. temperatures thereof.

Modified ejector-stripper

As indicated briefly above, the ejection of the ice bodies II from the mold cavities 133 is effected herein by an ejector 131 comprising a plurality of fingers 188 carried by a shaft 189. As best seen in FIGURES 13 and 14, the inlet 127 comprises a plastic cup member provided with a depending annular bearing 190 secured to wall 173 by a pair of bosses 191 and 192 upstanding from the rear end of the mold. Inlet 127, as seen in FIGURE 12, defines a well 193 for receiving water from the conduit 129 (FIGURE 9) and a chute 194 for conducting the water from the well 193 through an opening 195 into the rear cavity 133a of the mold.

Referring to FIGURE 13, the rear end 196 of the ejector shaft 189 is journalled in the bearing 190. The forward end 197 of the shaft 189 is journalled in a bearing portion 198 of the rear wall 199 of a housing 200 of control 130 and is provided with a flatted connecting portion 201 received in a corresponding recess 202 of a shaft 203 which as will be explained more fully hereinafter is driven by a motor 204 of the control 130. As seen in FIGURE 13, each finger 188 is provided with a flat, ice body-engaging, ejector surface 205 and tapers from a substantially pentagonal cross-section adjacent shaft 189 to a substantially triangular cross-section at an outer tip 206. The ejector 131 may be formed of a suitable plastic material (e.g. acetyl resin, nylon, etc.) having sufficient strength to apply the necessary ejection forces to the ice bodies II in the cavities 133.

The motor 204 rotates ejector 131 about the axis of the shaft 189 in a clockwise direction as seen in FIGURE 14, whereby the surfaces 205 of the pair of fingers 188 aligned with each cavity 133 bear against the upper surface of the ice body at level L and carry it in an arc about the axis of the shaft 189 to above the cavity 133 and to laterally beyond the wall 171 of the mold to fall into the subjacent collecting bin 119, as shown in FIGURE 9. A sheathed resistance heater 207 is disposed in the mold wall 170 for delivering heat to the mold so as to melt the surface of the ice body confronting the mold wall and thereby facilitate the freeing of the ice body from the mold when the ejector fingers 188 are brought thereagainst.

To strip the ice body positively from the ejector fingers 188 when the ice body reaches a position overlying right-hand wall 171, a stripper member 208 is mounted on the mold having a plurality of fingers 209a and 209b which overlie respectively the partial dividing walls 134 and the partition walls 132. As best seen in FIGURE 14, the stripper member 208 includes an apron 210 having a recessed connecting portion 211 carried on an outturned flange 212 at the upper end of the mold side wall 171. The stripper member herein comprises a molded member having the fingers formed integrally with the apron 210. The fingers 209a and 209b are arranged to rest on the upper edges of the dividing and partition walls. The flatwise extent of the fingers 209a and 209b is perpendicular to the spacing between the fingers, or parallel to the flatwise extent of the dividing and partition walls and, thus, the fingers effectively define upper wall extensions of the dividing and partition walls. As best seen in FIGURE 12, the fingers narrow toward their distal ends so that the spacing between adjoining portions of the fingers overlying mold side wall 171 is less than the spacing between the distal ends of the fingers adjacent ejector shaft 189.

The fingers 209a effectively define stripper fingers which are disposed in overlying relationship to the space S (and cavity 133) mid-way between the front and rear ends of the cavity defined by the partition walls 132. Thus, the stripper finger 209a effectively positively block re-entry of the ejected ice body back into the cavity 133 as it is swung about the axis of the shaft 189 by the ejector fingers 188. As best seen in FIGURE 14, the upper surface 213 of each finger 209a and 209b is inclined downwardly toward apron 210 so as to guide the stripped ice body downwardly around the right side wall 171 and into the subjacent collecting bin 119.

Fingers 209b are substantially similar to fingers 209a but are arranged to overlie the partition walls 132 defining the ends of the cavities 133. Thus, fingers 209b effectively comprise guide fingers which effectively preclude cocking of the ice bodies as they are stripped from the ejector between stripper fingers 209b and, thus, co-operate with the stripper fingers 209a in effectively blocking re-entry of the ejected ice bodies into the cavities 133. The spacing between the guide fingers 209b is slightly less than the width of the ice bodies (the fore and aft dimension thereof perpendicular to the planes of the partition walls 132) and, thus, each of the opposite ends of the ice body engages the corresponding guide fingers during the stripping operation to be guided thereby as discussed above. The inclined upper surfaces 213 of the guide fingers similarly direct the stripped ice bodies over the side wall 171 and apron 210 to fall into the collecting bin, whereby the impact forces resulting from this free fall of the ice bodies effectively break the frangible connections 178 between the respective ice bodies II, thereby comprising the formation of the plurality of the ice bodies II.

The stripper member 208, comprising the stripper fingers 209a, the guide fingers 209b, and the apron 210, is preferably a one-piece molding formed of an insulating plastic so as to minimize melting of the ice bodies II when in engagement therewith. The insulating fingers 209a and 209b preclude engagement of the ice bodies with the metal mold walls and the insulating apron 210 precludes engagement thereof with the exterior of side wall 171 during transfer of the ice bodies to the collecting bin.

*Modified motor-drive*

The control 130, as indicated above, includes a motor 204 which provides the necessary ejection force to the ejector 131. The motor 204 is provided with an output shaft 214 shown in FIGURE 11 extending forwardly from the motor through a front mounting plate 215 in housing 200 and carrying forwardly of the plate 215 a drive gear 216 meshing with a larger gear 217 carried on the forward end 218 of the shaft 203 driving the ejector 131. Shaft end 218 is journalled in an opening 219 in plate 215 and includes a forward cam portion 220 immediately rearwardly of the plate 215 (see FIGURE 16). As best seen in FIGURE 15, cam portion 220 is provided with a pair of camming recesses 221 and 222 which are spaced apart approximately 90 degrees to control operation of a pair of snap acting switches 223 and 224 having plungers 225 and 226, respectively.

Not only must motor 204 provide the necessary torque for ejecting the ice bodies from the mold cavities, but also must provide accurate timing of the control cycle. For example, the water fill control means of control 130 is arranged to open the water supply valve 128 for a preselected period of time proper for delivering a quantity of water to the mold 126 for accurately filling the cavities 133 to the level L. Undesirable variations in the timing as may result from undesirable variations in the speed of the drive motor may cause the water delivery to vary during successive cycles and thereby cause the ice bodies to vary undesirably in size and in the frangible nature of the connections between the ice bodies and ice body portions. Herein, motor 204 is an hysteresis type synchronous motor which operates at a substantially constant speed at all times. In the illustrated embodiment, motor 204 develops approximately 40 inch ounces of starting torque and 70 inch ounces of stalling torque at rated voltage. The gearing is preferably arranged to operate the ejector at less than approximately one r.p.m. and herein operates the ejector at approximately one-third r.p.m. and with less than approximately 15 inch-pounds of torque, herein the motor and gearing are preselected to operate the ejector with approximately 13 inch-pounds of torque. The use of the hysteresis synchronous motor provides the highly desirable advantages herein of low cost, small size, low weight, accurate repetitive timing, and reduced stalling torque permitting the use of the molded plastic (e.g. acetyl resin, nylon, etc.) ejector and eliminating the need for door switches and the like heretofore required to prevent operation of the ejector when the ice maker was exposed to the user. Further, synchronous motor 204 provides a small coasting which effectively precludes "dead breaking" of the double throw switch 223. More specifically, double throw switch 223 is arranged to energize the motor 204 when in either of its fully thrown positions, as shown in FIGURE 10. During the movement of the moving contact 223b thereof, however, between the fully thrown positions, the motor 204 is effectively de-energized. It is desirable, therefore, that the motor coast sufficiently so as to cause cam surface 222 to effect fully throwing of the switch and prevent a condition wherein the moving contact 223b is held somewhere intermediate its fully thrown positions with the motor maintained de-energized.

It is further desirable in control 130 to provide a unidirectional drive which will permit simplified manual reverse movement as during adjustment of the control. As the hysteresis motor 204 provides a unidirectional operation without ratchets and the like necessary to provide unidirectional operation with induction motors, simplified adjustment and testing is obtained. Further, as the mechanism to provide unidirectional operation is eliminated by means of hysteresis motor 204, a much quieter operation is obtained during the stalled condition as hunting is effectively eliminated. At the same time, the possibility of gear damage is effectively precluded.

*Modified water fill control*

Switch 223 is fixedly secured to the rear of the plate 215 by means of a pair of screws 227 extending through the switch and a spacer block 228 and threaded through the plate 215 (FIGURE 16). Switch 224 is secured to a support bar 229 by a pair of screws 230 and 231. As seen in FIGURE 11, the lower screw 231 extends through a small threaded opening 232 in the plate 215 to pivotally mount the support 229 on the plate 215. The screw 230 extends through a large opening 233 in the plate 215 which permits arcuate movement of screw 230 about the axis of screw 231 and thereby permits switch 224 carried by the support 229 to move arcuately about the axis of screw 232 toward and from the cam 220, as best seen in FIGURE 15. The pivotal disposition of the support 229 is controlled by a screw 234 which extends through a turned tab 235 formed on the upper end of the support 229 and projecting through a rectangular opening 236 in the plate 215 (see FIGURE 11). The plate is provided with an upset tab 237 having a threaded opening 238 through which the screw 234 is threaded. A compression spring 239 is disposed between the tabs 235 and 237 to urge the tab 235 against the head 240 of the screw 234. Thus, by adjusting screw 234, the pivotal position of support 229 may be varied selectively in a clockwise or counterclockwise direction, as seen in FIGURE 11, to bring the switch 224 selectively away from and toward the cam 220 (FIGURE 15). A suitable indicia means 241 may be provided on the plate 215 for indicating the sense of control effected by the screw adjustment.

The bodily movement of the switch 224 effects an adjustable positioning of the actuator 226 thereof relative to the camming recess 221, which as best seen in FIGURE 15, includes an inwardly sloped leading cam surface 242 and an outwardly sloped trailing cam surface 243. The actuator 226 is spring biased outwardly against the cam so that by pivoting the switch 224 in a counterclockwise direction from the position shown in FIGURE 15, the switch will be operated with a lesser movement of the actuator along the surface 242 into the recess 221 and will require more times for actuator 226 to be restored to its normal position as the surface 243 moves thereagainst. Alternatively, by repositioning the switch in a clockwise direction from the position of FIGURE 15, the actuator must move further along the surface 242 into the recess 221 before actuation of the switch and will more quickly restore the switch to the normal condition. Thus, a counterclockwise repositioning of the switch causes the switch to be operated for a longer period of time, whereas a clockwise repositioning causes the switch to be actuated for a lesser period of time with the control of the operational time being infinitely adjustable over a preselected range by means of screw 234.

Referring now to FIGURE 23, a modified form of means for bodily adjusting the position of switch 224 is shown to comprise a screw 244 having, in lieu of head 235, an elongated shaft 245 which projects outwardly through a suitable opening 246 in the housing 200. At its outer end, the shaft 245 is provided with a knurled knob 247 which is arranged for fingertip manipulation to effect the desired adjustment of screw 244 from externally of the housing. The shaft 245 may be provided with suitable indicia means 248 outwardly of the housing for indicating the sense of adjustment. Thus, the modified form of control as shown in FIGURE 23 is identical to the control provided by screw 234, except that screw 244 having the associated shaft 245 permits an adjustment of the positioning of the switch 224 from externally of the housing.

In FIGURE 24 still another modified form of means for adjusting the position of switch 224 is shown to comprise a similar control except having a support 249 which is elongated as compared to support 229 and which has a distal end 250 projecting through a slot 251 in the housing 200 so as to be manipulatable from externally of the housing. One edge 252 of the slot is notched to cooperate with a beveled rib 253 on the support end 250 releasably biased thereagainst to hold the support in any one of a plurality of selected pivotal positions.

*Modified bin level control means*

As further indicated above, the control 130 includes means for sensing the level of ice bodies in the subjacent collecting bin 119. Herein, the sensing means comprises a sensing arm 261. Referring to FIGURES 19 through 22, the sensing arm includes an outer sensing portion 262 which extends downwardly from an external well 263 in the housing 200. At its upper end the portion 262 is provided with a turned portion 264 which passes through an opening 265 in the rear wall 199 of the housing. The distal end 266 of the arm 261 is pivotally received in an opening 267 in the plate 215 and a U-shaped actuating portion generally designated 268 extends between turned portion 264 and distal end 266. The U-shaped portion includes an outer portion 269 extending downwardly from turned portion 264, a bright portion 270 extending transversely from the lower end of the outer portion 269, and an upturned portion 271 extending from the bight portion to distal end portion 266.

A spring 272 is provided for biasing the sensing arm 261 in a clockwise direction, as seen in FIGURE 19, and rearwardly as seen in FIGURE 21. More specifically, the spring 272 includes a coil portion 273 wrapped around the distal end 266 rearwardly of plate 215 and terminating in an elongated end 274 having a turned portion 275 adapted to bear against the right side wall 276 of the housing 200. The opposite end 277 of the spring 272 is provided with a turned first force transfer portion 278 bearing against the right-hand side of the leg 271 (see FIGURE 22) of the U-shaped portion 268 of the sensing arm with the spring being under tension to forcibly bias the leg in a clockwise direction as seen in FIGURE 19. Spring end 277 further includes an intermediate, second force transfer portion 279 extending from the coil portion 273 to bear against the forward edge 280 of the leg 271. The coil portion 273 is under compression to provide a biasing force through portion 279 against leg 271 of the sensing arm to urge the entire sensing arm rearwardly, or to the right as seen in FIGURE 21, to urge leg 269 against the rear wall 199 of housing 200. As shown in FIGURE 21, the rear wall 199 is provided with a forwardly projecting boss 281 which lies in the path of movement of rear leg 269 as it moves along the wall 199. The boss 281 is preferably provided with an inclined, camming side surface which as shown in FIGURE 21 is defined by a rounded profile for camming the U-shaped actuating portion 268 away from the wall 199 when the leg 269 is moved against the boss.

The bight 270 of the U-shaped portion 268 is movably received in a slot 282 of a crank 283 which includes a cam follower 284 (FIGURE 19) engaging a rearward cam section 285 of the cam portion 220 of shaft 203. The crank is pivotally mounted on a boss 286 projecting forwardly from rear wall 199 of the housing 200 by means of a pivot screw 287. As shown in FIGURE 19, pivoting of the crank 283 about the pivot 287 is effected by the rotation of cam section 285 as follower 284 is urged thereagainst by the spring 272.

The crank 283 is provided with a tab 288 which engages an actuator 289 of a shut-off switch 290 secured to the rear wall 199 by a pair of screws 291. The pivotal movement of the crank 283 thusly operates the switch 290 and concurrently acts through the actuating portion 268 of the sensing arm 261 to move the outer sensing portion 262 of the sensing arm between a lowermost position shown in dotted lines in FIGURE 20 to an uppermost position shown in full lines therein. Further, the user may move the sensing arm portion 262 to an upper shut-off position as shown in broken lines in FIGURE 19, which, as illustrated in FIGURE 22, moves the leg portion 268 of the sensing arm in a counterclockwise direction beyond the boss 281. As indicated above, the portion 277 of the coil spring 272 forces the leg 269 of the U-shaped actuating portion against the wall 199 with a second force which is transverse to the force generated by the spring 272 through the portion 278 bearing against the leg 271 of the actuating portion. The relative magnitudes of these transverse forces is coordinated with the slope of the boss 281 providing the camming of leg 269 away from wall 199 so as to assure the retention of the leg 269 behind the boss against the force developed between spring end 278 and leg 271 tending to move the leg 269 back past the boss 281. Thus, the leg 269 is effectively retained by the boss 281 with the sensing arm in the upper position of FIGURE 22 wherein the tab 288 is spaced from the actuator 289 to thereby preclude further operation of the ice maker. The resilient resistance of the spring 272 may be readily overcome, however, when it is desired to return the sensing arm to the lower positions of FIGURE 19, by intentional manipulation by the user. Thus, to return the sensing arm 261 to the operating position, the user merely moves the control arm against the compressional bias of spring 272 past the boss 281 in a clockwise direction, whereupon normal operation of the sensing arm with portion 278 biasing the actuating portion 268 in a clockwise direction as shown in FIGURE 19 may again occur.

Manual start means

At certain times, such as in the testing of the ice maker 118 during manufacture thereof, it is desirable to effect movement of the cam portion 220 to initiate an ejection cycle in the absence of the formation of any ice bodies in the mold cavities. To this end, the cam 220 is provided with an additional camming surface 292 which as shown in FIGURE 16 faces axially of the shaft 203. Operation of switch 223 by the engagement of cam surface 292 with the actuator 225 thereof is effected by manual movement of the entire shaft 203 axially rearwardly, or to the right as seen in FIGURE 16. As best seen in FIGURE 11, gear 217 is provided with a plurality of integrally molded spring fingers 293. The shaft is biased forwardly or to the left as seen in FIGURE 16 by the spring fingers which bear against the plate 215 and urge the gear 217 axially forwardly, or to the left as seen in FIGURE 16, against a washer 294 held against the gear by a suitable screw 295 extending through the washer and gear into the shaft cam portion 220 and provided with a head slot 295a. The cam portion 220 is provided with a plurality of forwardly projecting lugs 296 which bear against the cover plate to have low friction movement thereagainst and locate the cam 220 as shown in FIGURE 16. The forward end 218 of the shaft 203 is axially slidably received in the opening 219 in plate 215 and the shaft portion 203 in bearing 198 is axially movable therein to permit limited axial rearward movement of the shaft and cam, to the right as seen in FIGURE 16, and thereby cause the cam surface 292 to engage the actuator 225 to operate switch 223. Such rearward movement of the shaft and cam to operate switch 223 is easily effected by a manual pushing force applied against the face of gear 217. Release of the manually applied force to the gear after motor 204 has been energized sufficiently to rotate cam 220 to maintain switch 223 closed permits the stressed spring fingers 293 as illustrated in FIGURE 18 to restore the shaft 203 to the full line, retracted position of FIGURE 16, while the switch 223 is maintained in circuit energizing disposition. Thus, the cam 220 includes a first camming means 222 which cooperates with actuator 225 of switch 223 to operate the switch and thereby energize the drive motor 204 upon a preselected amount of rotation of the cam 220 from the reset position wherein the cam stops at the end of each ejection cycle. In addition, the cam 220 includes a second cam means 292 which energizes the motor 204 upon a preselected axial movement of the cam 220 from the preselected retracted position shown in full lines in FIGURE 16.

Alternatively, the drive may be rotated manually to cause the cam surface 222 to operate actuator 225 to energize motor 204. The manual rotation may be effected by means of a screwdriver or the like in engagement with a slot 216a of the screw drive gear 216 to rotate the cam 222 sufficiently to operate the switch 223.

Operation of modified ice maker

Operation of ice maker 118 may best be understood with reference to the schematic wiring diagram of FIGURE 10. As shown therein, switch 224 is provided with a moving contact 224b and a fixed contact 224a. The fixed contact 224a is connected to the solenoid 128a of solenoid valve 128 which in turn is connected to one side $L_1$ of the power supply, which may comprise the conventional single phase, 120-volt alternating house current power supply. The moving contact 224b is connected to a first fixed contact 223a of switch 223 and to a fixed contact 254a of thermostat switch 254. The switch 223 as indicated above further includes a moving contact 223b which is connected to the motor 204 which in turn is connected to the other side $L_2$ of the power supply and to one end of the mold heater 207, the other end of the mold heater being connected to contact 254a of thermostat 254. Moving contact 223b of switch 223 is further connected to a fixed contact 290a of switch 290. The thermostat 254 includes a moving contact 254b which is connected to a moving contact 290b of switch 290. Switch 290 further includes a second fixed contact 290c which is connected to side $L_1$ of the power supply. Switch 223 further includes a second fixed contact 223c which is also connected to side $L_1$ of the power supply.

Assuming that mold 126 contains a quantity of water previously delivered thereto from the water supply and which is in the process of being frozen in the cavities 133 to form the ice bodies II, and the level of ice bodies in collecting bin 119 is below the preselected level, the functioning of ice maker 118 is as follows. Mold thermostat 254 senses the relatively warm temperature of the mold indicating the incomplete freezing of the ice bodies. Thus, contact 254b of thermostat 254 is spaced from contact 254a breaking the circuit from power supply side $L_1$ to control motor 204. Further, switch 290 is in the position shown in FIGURE 10 with its moving contact 290b engaging fixed contact 290c, and switch 223 is in the position shown in FIGURE 10 with its moving contact 223b engaging its fixed contact 223a. The switch 224 is in the open position having its moving contact 224b spaced from fixed contact 224a, thereby de-energizing the solenoid 128a. Thus, as shown in FIGURE 10, the control is in a de-energized condition wherein none of the motor 204, heater 207, or solenoid 128a is energized.

As discussed above, when the temperature sensed by thermostat 254 drops a small amount below freezing, such as to approximately 23° F., the thermostat contact 254b moves into engagement with fixed contact 254a thus establishing a circuit from power supply side $L_1$ through switch 290 and switch 223 to the motor 204. At the same time, the heater 207 is energized by the closing of thermostat switch 254. In the shut-off position, the fingers 188 of the ejector 131 are in the position of FIGURE 14. Energization of motor 204 causes a rotation of shaft 189 to bring the fingers around in a clockwise direction, as seen in FIGURE 14, to engage the right-hand upper surface of the ice bodies in the cavities 133. During this rotation, the mold is being heated by the heater 207 to free the ice bodies from the mold. During the initial portion of this rotation, cam 220 firstly actuates switch 223 to throw the moving contact 223b from fixed contact 223a into engagement with fixed contact 223c, thereby providing a holding circuit from power supply side $L_1$ directly to the motor 204 and thereby maintaining the motor energized irrespective of the condition of thermostat switch 254 during the remainder of the ejection cycle. A small additional amount of rotation of motor 204 causes cam section 285 to pivot crank 283 in a clockwise direction, as seen in FIGURE 19, and thereby raise the sensing arm portion 262 upwardly from the collecting bin 119. Concurrently, the movement of tab 288 away from actuator 289 causes moving contact 290b of switch 290 to move from fixed contact 290c and into engagement with fixed contact 290a. Thus, heater 207 is energized through switches 223 and 290 in series with thermostat switch 254 so as to maintain the heater under the control of the thermostat switch while allowing the motor 204 to be independent thereof.

In the event that the ice bodies have not been sufficiently freed from the mold walls through energization of heater 207 such as to permit the ejector fingers 188 to force the ice bodies outwardly from the cavities when the fingers engage the ice bodies, the motor 204 stalls. When the heater sufficiently frees the ice bodies from the mold walls to permit the ejector fingers to force the ice bodies outwardly therefrom, rotation of motor 204 recommences. As the fingers sweep through the cavities in a clockwise direction, as seen in FIGURE 14, the sensing arm portion 262 moves downwardly into the collecting bin 119. Assuming that the level of ice bodies therein is below the preselected upper level, the arm moves unimpededly to its lowermost position. In this position, tab 288 acts against actuator 289 to dispose switch 290 with moving contact 290b in engagement with fixed contact 290c.

After approximately 330 degrees of rotation, recess 221 of cam portion 220 moves into alignment with actuator 226 of switch 224 (FIGURE 15), thereby permitting the bias of switch 224 to close moving contact 224b with fixed contact 224a. However, as contact 254a is connected to power supply side $L_1$ through switches 254 and 290, the solenoid 128a is shunted out and no energization of the solenoid is effected at this time.

Motor 204 continues to rotate, driving the ejector fingers upwardly from the mold cavities 133 and bringing the ice bodies outwardly from the cavities onto the stripper fingers 209 in an inverted position thereon. The cam 220 now moves moving contact 223b of switch 223 from contact 223c into engagement with contact 223a. The motor is now energized from power supply side $L_1$ through switches 290, 254 and 223 and, thus, continues to rotate. The continued movement of the fingers 188 of the ejector 131 causes the ice bodies to move downwardly over the upper surface 213 of the stripper fingers into the collecting bin 119. As discussed above, the ice bodies are positively stripped from the fingers by the improved construction of the ejector fingers, providing the ice bodies II for delivery to the collecting bin in the bifurcated form shown in FIGURE 23.

After the ice bodies are stripped and conducted away from the mold to the collecting bin, the ejector fingers continue to move in a clockwise direction as shown in FIGURE 14 to once again sweep through the cavities 133. During this second movement of the fingers through the cavities, the cam 220 repositions the moving contact 223b of switch 223 in engagement with fixed contact 223c, thereby re-establishing the holding circuit to motor 204. By utilizing the second rotational cycle of the ice maker, a sufficient time delay is obtained to permit the thermostat 254 to reset notwithstanding the relatively high reset temperature requirement thereof. The resetting of the thermostat is facilitated by the now complete removal of ice bodies from the mold permitting the heat energy from electrical heater 207 to raise the temperature of the front mold wall 174 as sensed by thermostat 254 to the reset temperature, herein approximately 50° F.

As the motor 204 recycles cam 220, switch 290 is again operated by the cam to throw its moving contact 290b from contact 290c into engagement with contact 290a. As indicated above, at this time, sufficient heat from the heater 207 will have been delivered to the mold wall 174 to cause the temperature sensed by thermostat sensor 255 to cause moving contact 254b to become spaced from fixed contact 254a. This transfer of the thermostat switch may be effected, for example, at a temperature of approximately 50° F.±5° F. Thus, mold heater 207 is de-energized at this time. Continued operation of motor 204 by means of the holding circuit through switch 223 causes the cam 220 to rotate once again to the position wherein moving contact 224b of switch 224 closes with fixed contact 224a thereof. At this time, however, thermostat switch 254 is open and, thus, the solenoid 128a is not shunted out when switch 224 closes but rather is energized through switch 224 and mold heater 207 to open valve 128 and deliver water from the water supply through the inlet 127 into the mold as discussed above.

Further, as discussed above, the adjustment of the position of switch 224 by means of the adjustment of support 229 permits an accurate control of the time during which the switch 224 is closed. As indicated briefly above, if the quantity of water delivered to the mold during the originally set time controlled by the adjustment of screw 234 is too short to provide the necessary quantity of water to the mold cavities, suitable adjustment of the screw may be effected to adjust the position of switch 224 to permit the closing of the switch 224 for a longer period of time. Reversely, if the quantity of water is too great, adjustment of screw 234 may be effected in a reverse direction to shorten the water delivery time. The indicia means 241, as shown in FIGURE 11, 248 as shown in FIGURE 23 and 297 as shown in FIGURE 24, indicate the direction of adjustment necessary to increase or decrease the quantity of water.

The continued rotation of motor 204 and, thus, of cam 220 subsequent to the reopening of switch 224 causes moving contact 223b of switch 223 to move from contact 223c to contact 223a, thereby breaking the holding circuit to motor 204 and de-energizing the control 130 until the next quantity of ice bodies are formed in the cavities 133 to initiate another cycle as described above.

When the level of ice bodies in the collecting bin 119 is sufficient to preclude the free movement of the sensing arm portion 262 downwardly into the collecting bin to the lower position shown in dotted lines in FIGURE 20, the operation of control 130 is interrupted because tab 288 does not permit contact 290b of switch 290 to move from fixed contact 290a. Thus, the portion of the cycle wherein motor 204 is energized through switches 290 and 254 cannot be effected, and the ice maker remains inoperative until such time as the level of ice bodies in the collecting bin is lowered sufficiently to permit the sensing arm to drop due to biasing action of spring 272 and thereby operate actuator 289 to again throw moving contact 290b into engagement with fixed contact 290c.

It should be noted that the interruption of the operation of the ice maker by the blocking of sensing arm 261 may be effected during either of the two 360 degree movements of the ejector fingers 188 through the cavities 133. Thus, when a fresh group of ice bodies is delivered to the collecting bin and raises the level thereof above the preselected level, this condition is sensed during the immediately following second 360 degree rotation of the ejector whereupon the ice maker is de-energized and prevented from recycling after the holding switch 223 opens.

Ice maker 118 is extremely simple and economical of construction while providing long trouble-free life. It is of minimum size and weight for facilitated installation in freezers and the like where minimum size is a desideratum. The positive stripping of the ice bodies from the ejector and the provision of the ice bodies in bifurcated form for facilitated selective use as single or double size bodies provides a highly desirable feature.

While I have shown and described certain embodiments of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows:

1. In an ice maker, apparatus comprising:
   a mold;
   a plurality of partition walls disposed within said mold to define a plurality of cavities in which water is to be frozen;
   a stripper member disposed in each said cavity and having a minor upper portion thereof disposed above the cavity; and
   means for ejecting the ice body from the mold including means for moving the ice body to above the cavity and against said upper portion of the stripper member to free the ice body and direct it to laterally of said mold.

2. In an ice maker, the apparatus comprising:
   a mold;
   a plurality of partition walls disposed within said mold to define a plurality of cavities in which water is to be frozen;
   a stripper member having a lower portion disposed in each said cavity and an upper portion disposed above the cavity, said lower portion being disposed centrally within the cavity to divide a lower portion of each cavity into two, spaced portions; and means for ejecting the ice body from the mold including means for moving the ice body to above the cavity and against said upper portion of the stripper member to free the ice body and direct it to laterally of said mold.

3. The apparatus of claim 2 wherein said lower portion extends a major portion of the vertical cross-section of the body.

4. In an ice maker, apparatus comprising:
a mold;
a plurality of partition walls disposed within said mold to define a plurality of cavities in which water is to be frozen;
a stripper member disposed in each said cavity and having an upper portion disposed above the cavity;
means for ejecting the ice body from the mold including means for moving the ice body to above the cavity and against said upper portion of the stripper member to free the ice body and direct it to laterally of said mold; and
means on the mold for collecting melt falling from the ice body during ejection thereof and delivering the melt to the mold cavity.

5. In an ice maker, apparatus comprising:
mold means defining an upwardly opening ice body forming cavity; a partial dividing wall in said cavity fixedly upstanding on said mold means partially dividing said cavity into two portions, said partial dividing wall having a top edge;
means adjacent said mold means for directing an ice body urged thereagainst away from said mold means;
means for moving an ice body formed in said cavity outwardly therefrom against said directing means; and
means for delivering water into said cavity to have a preselected level therein whereby at least a portion of said top edge of the partial dividing wall is submerged sufficiently below said level to cause an ice body formed in said cavity to define a pair of major portions spaced on opposite sides of said partial dividing wall and a frangible minor connecting portion between said major portions of sufficient strength to preclude breakage thereof by the engagement of the ice body with the directing means, while permitting ready manual breaking of said connecting portion.

6. The ice maker apparatus of claim 5 wherein said directing means is aligned with said partial dividing wall and includes means for engaging said connecting portion to block movement of an ejected ice body back into said cavity.

7. The ice maker apparatus of claim 5 wherein said partial dividing wall is formed of a thermally conductive material.

8. The ice maker apparatus of claim 5 wherein said partial dividing wall extends across at least approximately one-half the vertical cross-section of said cavity.

9. The ice maker apparatus of claim 5 wherein said partial dividing wall is provided with an extension disposed upwardly of said cavity for blocking movement of an ejected ice body back into said cavity.

10. The ice maker apparatus of claim 5 wherein said directing means is formed of a thermally insulating material.

11. The ice maker apparatus of claim 5 wherein said partial dividing wall is defined by an inner wedge-shaped edge providing a relative narrow fracture line in the ice body.

12. The ice maker apparatus of claim 5 wherein said mold means includes a wedge-shaped rib aligned with said partial dividing wall providing a fracture line along a portion of the periphery of the ice body.

13. The ice maker apparatus of claim 5 including an apron formed of thermally insulating material adjacent the exterior of said mold means for precluding contact of the ejected ice body with the exterior of said mold means as said ice body is directed away from the mold means.

14. The ice maker apparatus of claim 5 wherein said ice body moving means is formed of a plastic material and comprises:
a shaft; and
a plurality of fingers projecting transversely outwardly from said shaft, each of said fingers having a flat surface for applying an ejection force being in a common plane tangent to said shaft and having an odd number-of-sides polygonal cross-section perpendicular to said plane and parallel to the axis of said shaft thereby to provide a rigid finger construction effectively precluding breaking of the fingers between ice moving forces acting therethrough.

15. The ice maker apparatus of claim 5 wherein said directing means comprises an apron and a plurality of spaced, substantially parallel flat stripper fingers extending from said apron, said directing means being formed of an insulating plastic.

16. In an ice maker, apparatus comprising:
mold means defining a mold cavity in which water is frozen to form an ice body, and a partial dividing wall integral with said mold means for providing a recess in the ice body, said partial dividing wall extending transversely across said cavity;
means for collecting ice bodies;
means for applying a mechanical force against said ice body for effecting transfer of said ice body from the mold to said collecting means; and
means for introducing water into said mold cavity to submerge at least a portion of said partial dividing wall in a body of water to cause an ice body formed in said cavity to have a frangible minor connecting portion having a cross-sectional area sufficient to prevent breakage of said connecting portion by the forces exerted thereon by said transfer means while facilitating ready manual breaking of said connecting portion.

17. In an ice maker, apparatus comprising:
mold means defining a space in which water is frozen to form an ice body, said mold means including a pair of opposite partition walls, and dividing wall means for providing a peripheral break-controlling slot in the ice body, said wall means extending partially across said space inwardly from one boundary of said space and extending lengthwise along the periphery of said space at least approximately one-half the full periphery of the space;
means for storing ice bodies;
means for ejecting and transferring the ice body from the mold to said storing means;
stripper means disposed above said mold space adjacent one edge of the mold space intermediate said partition walls for preventing return of an ejected ice body into said mold space; and
means for introducing water into said mold space wherein an ice body formed in said mold space comprises a pair of major portions disposed to opposite sides widthwise of said dividing wall means and a minor connecting portion extending from the dividing wall means in the direction thereof across the remainder of said mold space and frangibly connecting said major portions of the ice body, the partial extent of the dividing wall means across said mold space being preselected to cause such connecting portion of the ice body to have a minimum cross-sectional area parallel to the lengthwise extent of said dividing wall means sufficient to prevent breakage of said connecting portion by the forces exerted thereon during transfer of the ice body into said storing means while facilitating ready subsequent manual breaking of said connecting portion when desired, said stripper means being substantially aligned with said dividing wall means whereby said stripper means is engaged by an ejected ice body along said frangible minor connecting portion.

References Cited by the Examiner
UNITED STATES PATENTS

| | | | |
|---|---|---|---|
| 2,253,512 | 8/1941 | Fechner et al. | 62—340 |
| 2,776,545 | 1/1957 | Miller et al. | 62—135 |
| 2,833,123 | 5/1958 | Kennedy et al. | 62—135 |
| 2,844,008 | 7/1958 | Barton | 62—353 X |
| 2,967,406 | 1/1961 | Buzicky | 62—340 |
| 2,968,168 | 1/1961 | Lippincott | 62—344 |
| 3,034,312 | 5/1962 | Harle | 62—137 X |
| 3,075,364 | 1/1963 | Kniffin | 62—353 |
| 3,182,468 | 5/1965 | Archer | 62—353 |

ROBERT A. O'LEARY, *Primary Examiner.*

MEYER PERLIN, *Examiner.*

W. E. WAYNER, *Assistant Examiner.*